United States Patent [19]

Bollinger

[11] 4,183,890

[45] Jan. 15, 1980

[54] METHOD OF CUTTING HOLLOW FILAMENTS EMBEDDED IN RESINOUS MASS

[75] Inventor: Wayne A. Bollinger, Cary, N.C.

[73] Assignee: Monsanto Company, St. Louis, Mo.

[21] Appl. No.: 855,846

[22] Filed: Nov. 30, 1977

[51] Int. Cl.$^2$ ............................................. B32B 31/00
[52] U.S. Cl. .................................... 264/139; 156/296; 264/118; 264/128; 264/138; 264/159; 427/293
[58] Field of Search ............... 264/159, 118, 128, 138, 264/139; 156/296; 427/293

[56] References Cited

U.S. PATENT DOCUMENTS

| | | | |
|---|---|---|---|
| 3,423,491 | 1/1969 | McLain et al. | 264/49 |
| 3,503,228 | 3/1970 | Swartling | 82/48 |

*Primary Examiner*—James H. Derrington
*Attorney, Agent, or Firm*—Norman L. Balmer; Howard C. Stanley; James W. Williams, Jr.

[57] ABSTRACT

Hollow filaments, which are suitable for use in separating one or more components from a fluid mixture by selective permeation, are embedded, or potted, in a curable resinous mass, and the resinous mass is severed to expose fluid communication openings of the hollow filaments. In accordance with the invention the curable resinous mass is sufficiently partially-cured to provide a solid mass which can be severed but does not tend to smear when severed so as to obstruct fluid communication openings of the hollow filaments; however, the partial curing is insufficient to render the severings of the resinous mass unduly difficult. The resinous mass is then severed, e.g., by cutting, to provide the fluid communication openings in the hollow filaments embedded in the resinous mass. Advantageously, the fluid communication openings of substantially all of the filaments exposed by severing the resinous mass can be essentially unobstructed, and the integrity of the filaments and the resinous mass is substantially maintained during severing. The curing of the resinous mass can be completed after severing to provide a sealing means which has high structural strength.

10 Claims, No Drawings

METHOD OF CUTTING HOLLOW FILAMENTS EMBEDDED IN RESINOUS MASS

This invention pertains to methods for producing permeation separation apparatus having a plurality of hollow filaments suitable for effecting separation by permeation wherein at least one end portion of the hollow filaments is embedded in an end sealing means, said end sealing means comprising a resinous mass. Particularly, this invention pertains to methods for severing of the resinous mass whereby the structural integrity of the hollow filaments and resinous mass can be retained and the tendency for the severing to cause the fluid communication openings of the hollow filaments to become occluded is reduced.

Hollow filament permeation apparatus for fluid separations comprise a plurality of hollow filaments. Each of the filaments has an exterior side and a bore side with the feed being passed to the exterior or bore side of the filaments and a permeated product being collected at the opposite side. In order to ensure the physical separation of the feed and permeate product, often at least one end segment of each of the hollow filaments is embedded in an essentially fluid impermeable sealing means. When installed in a suitable enclosure, the sealing means provides a barrier between the exterior and bore sides of the hollow filaments. The sealing means should thus sufficiently contact the exteriors of the hollow filaments such that fluid can not pass across the sealing means at the interface with the hollow filaments. The sealing means is advantageously adapted to be mounted in the enclosure in a fluid-tight relationship with the enclosure, and thus the sealing means may be required to be of predetermined dimensions. Especially in separation operations in which significant pressure differentials across the hollow filaments are utilized, the sealing means must exhibit high structural strength.

One suitable method for embedding hollow filaments within the sealing means involves casting or otherwise forming a resinous mass encompassing all of the filaments at least one segment to form the sealing means. The resinous mass is then cured and severed to expose the bores, i.e., provide fluid communication openings of the hollow filaments. If at least one end of a filament is not open, the filament can not be utilized in the separation process. When, for instance, the resinous mass is an epoxy and the filaments are relatively brittle, the resinous mass may often be cut with the use of, e.g., a razor blade with a substantial proportion of openness of the fluid communication openings of the filaments. However, when the filaments are more flexible and are relatively easily deformed without breaking, the cutting of the resinous mass to expose the fluid communication openings of the hollow filaments to provide a substantial proportion of openness of the fluid communication openings is significantly more difficult since the filaments tend to become smeared or deformed closed. Moreover, the filaments may be pulled and possibly at least partially separated from the resinous mass during cutting and thus not only may the fluid communication openings be obstructed but also, leaks may occur between the resinous mass and the outside periphery of the filament.

The sealing means frequently must exhibit high structural strength, in order to withstand pressure differentials which may be encountered during use. Moreover, often resins, which exhibit desirable chemical and physical resistance to feed streams including impurities in the feed streams, also exhibit high structural strength. Such resins have been found to be extremely difficult to sever while retaining the integrity of the resin-filament structure and without closing an unduly large number of filament openings. For instance, an extremely sharp cutting tool such as a razor blade or scalpel rapidly becomes dull and develops burs and thus can pull or smear the filament instead of providing smooth cut of the filament. The resin can be heated and cut while at an elevated temperature to facilitate the severing; however, frequently the filaments tend to lose excessive structural strength under elevated temperatures suitable for severing the resin. Thus, smearing still can occur resulting in closing fluid communication openings of the hollow filaments.

Various methods have been suggested for severing the resinous mass sealing means of hollow filament selective permeation apparatus. For instance, Swartling in U.S. Pat. No. 3,503,288 notes at column 2, lines 33 et seq., that the cutting of sealing means comprised of epoxy is difficult because the micro-sized filament openings become smeared or deformed closed when cut with conventional cutting tools with conventional cutting action. Swartling states at column 3, lines 70 et seq., that one of the more effective methods for cutting the resinous masses involves hand trimming with a scalpel. This method was found to provide separation apparatus having about 50 percent theoretical filament openness. Swartling notes that fracturing an epoxy seal by the application of a controlled bending force or a shaped explosive charge has provided filament openness approaching 100 percent, but that such methods are commercially and technically unacceptable since they are difficult to utilize with larger diameter sealing means due to the forces required, the difficulty in predicting and controlling the fracture, and the damage which may occur to the integrity of the sealing means between, e.g., the resinous mass and the hollow filaments. Swartling disclosed an apparatus for cutting a resinous mass having the hollow fibers embedded therein which apparatus employs a specially designed strong rigid cutting element which is circumferentially moved with respect to the resinous mass under certain conditions of speed, cutting angle and the like. Although the apparatus is complex, Swartling reports improved openness using the apparatus.

By the present invention there are provided improved methods for severing, e.g., by cutting resinous masses having hollow filaments embedded therein, which resinous masses are capable of achieving high structural strength as exhibited by Shore A hardness (ASTM D 2240) of at least about 80 or 90. The methods of this invention provide for good integrity of the hollow filaments and resinous mass after severing, with a desirably high proportion of openness of the fluid communication openings. Advantageously, the method can be practiced without modifying the composition of the resinous mass, and the hollow filaments can be comprised of a wide variety of materials yet acceptable cutting characteristics with a high proportion of open filament ends can be obtained.

In accordance with this invention, hollow filaments are embedded in a curable resinous mass in any suitable manner, e.g., by casting such as disclosed in U.S. Pat. Nos. 3,339,341 (Maxwell, et al) and 3,442,389 (McLain) or by impregnating with casting material while winding hollow filaments such as disclosed in U.S. Pat. Nos.

3,455,460 (Mahon) and 3,690,456 (McGinnis et al), herein incorporated by reference. By this invention, the cutting of the resinous mass to expose the open hollow filaments is conducted prior to curing or completion of curing of the resinous mass to a hardness which renders the severing difficult, e.g., the resinous mass exhibits a Shore A hardness of above about 80 or 90. The resin should be sufficiently cured at the time of the cutting operation that the resin does not tend to smear over the filament openings, i.e., the resin has sufficient structural integrity that it can be cut without undue flowing of the resin. The resin generally has elastic properties when cut in accordance with this invention and often exhibits an elongation to break of less than about 500 percent, say, about 20 to 500 percent, and sometimes about 50 to 300 percent. Advantageously, the resinous mass is sufficiently cured when cut that the resinous mass retains the hollow filaments during cutting such that substantially leak-proof contacts between the resinous mass and hollow filaments can be provided.

The resinous mass may be any suitable curable, or cross-linkable resin which cures to a Shore A hardness of at least about 80 or 90. By the resin being curable, it is meant that the resin becomes irreversibly set in a solid form. The curing may be through cross-linking of polymer molecules induced by heat or radiation. Curing agents may also be employed to provide the cured resin. Conveniently, the resin comprises an epoxy resin. The epoxy resin may comprise any suitable epoxy polymer such as the polyglycidyl ethers and polyglycidyl esters of polyfunctional alcohols or acids. Most frequently, the polyglycidyl ethers and polyglycidyl esters are difunctional although trifunctional or higher functional compounds may be employed, at least in a minor amount, to provide additional cross-linking sites. The polyfunctional alcohols or acids may be aliphatic or aromatic-containing compounds including hydroxy-containing polyethers. Often the polyfunctional compounds, e.g., polyols, contain at least one aromatic group due to the generally greater structural properties provided by the aromatic-containing epoxies as compared to the structural properties exhibited by many non-aromatic-containing epoxies. Illustrative of the aromatic-containing polyols are the polyhydric phenols which may be mononuclear phenols and polynuclear phenols and included within the group of polynuclear phenols are phenolaldehyde condensation products (novolacs) such as phenolformaldehyde resins and o-cresol-formaldehyde resins, (2,2-bis(4-hydroxyphenyl) propane), 4,4'-dihydroxybenzophenone, 1,1-bis(4-hydroxyphenyl)ethane, bis(2-hydroxynaphthyl) methane, 2,2-bis(4-hydroxyphenylbutane), bis(4-hydroxyphenyl) sulfone, and the like. Mononuclear polyhydric phenols include resorcinol, catechol, hydroquinone, phloroglucinol, and the like. Commonly, the epoxy is cured with a curing agent such as a polyfunctional amine, e.g., an aromatic diamine or mixture or aduct of mixtures thereof. Typical amines includes m-phenylene diamine, methylene dianiline, mixtures (including adducts) of m-phenylene diamine and methylene dianiline, diamino diphenyl sulfone, 4-chloro-o-phenylenediamine, and the like. Another useful curing agents include the 2,4-dialkylimidazoles, e.g., 2-ethyl-4-methylimidazole. Polyfunctional acids which may find applications in providing polyglycidyl esters include phthalic acid, isophthalic acid, linoleic dimer acid, etc. A more detailed discussion of epoxy resins may be found in, for instance, the *Encyclopedia of Polymer Science and Technology*, Volume 6, pages 209 et seq., Lee, et al, *Epoxy Resins*, McGraw-Hill (1957), and Lee, et al, *Handbook of Epoxy Resins*, McGraw-Hill (1967). Other thermosetting resins which may find application for use in accordance with this invention include the phenolic resins; polyester resins, for instance of the alkyl or styrene type; melamine-formaldehyde resins; urea-formaldehyde resins; polycarbonates and polyacrylics, e.g., polymethylmethacrylate, which resins have high structural strength when cured, for instance, Shore A hardness of at least about 80 or 90 and flexural strengths of at least about 12,000, preferably at least about 15,000 pounds per square inch as determined by ASTM D 790. The resin may combine fillers, plasticizers, accelerators, hand promoting agents, and other adjuvants. Advantageously, the resin should cure under conditions (either externally applied or by exotherms produced by curing) which do not deleteriously affect the filaments, for instance, under ambient or moderately elevated temperatures, e.g., up to about 200° C., preferably up to about 150° C.

The hollow filaments which are embedded in the resinous mass may be of any convenient configuration, e.g., circular, hexagonal, trilobal, or the like in cross-section and may have ridges, grooves, or the like extending inwardly or outwardly from the walls of the filaments. Generally, the maximum outside dimension of the cross-section of the filaments is at least about 10 microns and often is up to about 1000 microns, e.g., about 50 to 800 microns. The minimum wall thickness of the filaments is frequently at least about 1 micron, e.g., between about 5 and 300 microns.

Advantageously, this invention enables a wide range of materials to be employed for the fabrication of the hollow filaments. Thus, the hollow filaments can be comprised of polymer suitable for use in selective separation processes without undue concern as to whether or not the hollow filaments and resins can be severed without unduly closing the filament ends. Preferably, the resinous mass is capable of adhering to the hollow filaments. The hollow filaments are useful in fluid separations, i.e., they may serve as a support for a coating which provides the selective separation as the medium which effects the separation. Typical polymers suitable for the hollow fibers can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides, and aryl polyimides; polyethers; poly(arylene oxides) such as poly(phenylene oxide) and poly(xylylene oxide); poly (esteramide-diisocyanate); polyurethanes; polyesters (including polyarylates), such as poly(ethylene terephthalate), poly(alkyl methacrylates), poly(alkyl acrylates), poly (phenylene terephthalate), etc.; polysulfides; polymers from monomers having the alpha-olefinic unsaturation other than mentioned above such as poly-(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(- vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromidesodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like. The method of this invention is particularly attractive when the polymer is capable of being relatively easily deformed under pressure, e.g., exhibits an elongation of at least about 25, often at least about 50 or 100, percent so determined by ASTM D 638. The hardness of the material of the hollow filaments may vary widely and may even be substantially greater than the hardness of the resinous mass when cut in accordance with this invention, e.g., the hardness of the material of the hollow filaments may be a Shore A hardness of 95 or more. The polymer may contain modifiers, plasticizers, fillers, etc.

The end segments of the hollow filaments can be embedded in a substantially liquid, uncured resin in any suitable manner. For instance, the end segments of the filaments may be individually coated with the resin in liquid form and then end segments joined laterally to form an aggregate (or bundle) of the filaments in a desired cross-sectional configuration. Alternatively, the end segments of the filaments may be joined laterally and placed in a mold. Liquid, uncured resin can be introduced around or within the bundle of filaments and into the mold to provide a resinous mass of a predetermined configuration with the end segments of filaments therein. In order to assist in distributing the resin throughout the cross-section of the bundle of filaments pressure may be applied to the resin, e.g., by centrifuging.

The resin is then permitted to partially cure to provide a solid resinous mass. Generally, in curing, the resins thicken, form a gel and then proceed to form a hard solid. The partial curing is sufficient to provide a solid suitable for cutting operations, i.e., the resinous mass has substantially passed from the gel form into a solid form such that, when cut, the resin does not tend to smear. Most often with epoxy resins such as those derived from bisphenol A, the curing is allowed to proceed to provide a partially-cured resin Shore A hardness of at least about 50 or 60. With other resins which may be employed, the transition into the solid form suitable for cutting may occur at somewhat higher or lower hardnesses; however, in any event the cutting should not be conducted until the resin has sufficiently solidified that the tendency of the resin to smear during cutting, is essentially obviated.

One method for determining whether or not the resinous mass has sufficiently solidified for cutting is to cut a sample of the resin having the hollow filaments embedded therein and then observe the ends of the filaments to determine proportion of the openings of the filaments which are essentially unobstructed. Even though the ends of the hollow filaments may visually appear to be substantially open, minor obstructions which may partially close an opening may significantly affect the flow of the fluid to or from the bore of the filaments. The effect of these minor obstructions is further amplified in separation systems employing smaller diameter hollow filaments. Accordingly, the openness of the hollow filaments can be determined by fluid flow measurements through the bores of the hollow filaments. For instance, water can be passed through the bores of the hollow filaments and the pressure drop and flow rates can be compared with the theoretical flow through the fibers calculated from Poiseuille's law assuming laminar flow. Desirably, the cutting should be conducted when an openness of the hollow filaments of at least about 70, say, at least about 80, most preferably at least about 90 or 95, percent can be achieved.

It has also been found that an advantageous degree of partial curing of the resin, particularly epoxy-containing resins, is that when the hardness of the face of the resinous mass from which the hollow filaments extend in a substantially perpendicular direction approximates (within about 10 or 20 percent) the hardness of the partially-cured resin. Generally, the presence of the hollow filaments tends to enhance the structural strength including hardness of the resinous mass at the face whereas the hardness of the partially-cured resin itself may be somewhat less. The hardness of the resin itself can often be approximated by measuring the hardness of the resinous mass at side wall not having hollow filaments immediately adjacent to the wall, e.g., at least about 0.2 centimeters away from the side wall. When the hardness of the side approximates the hardness of the face, a general indication is provided that the resin has obtained a structural strength which is substantially independent of the presence of the hollow filaments, and thus the resin may be suitably partially cured for cutting. A particularly desirable degree of partial cutting of the resins in accordance with this invention is sufficient to provide a Shore A hardness of at least about 55 or 60 and up to about 75 or 80.

The cutting of the resinous mass and the hollow filaments, e.g., generally transversely to the orientation of the hollow fibers, to provide open fluid communication ends may be conducted in any suitable manner. Advantageously, a sharp knife edge, e.g., razor blade or scalpel, is employed to sever the resin and hollow filaments. Often, the knife edge has a radius of sharpness of less than about 2.5, e.g., about 0.1 to 2, microns and may have one or more bevels. Although the resin may be substantially softer than when in the substantially completely cured state, the knife edge may still become dull and should periodically be replaced. Often to minimize heat build-up which may deleteriously affect the hollow filaments and to reduce the force required to exit the resinous mass, relatively thin cuts are made, e.g., up to about 200, say, about 20 to 100 microns in thickness. A plurality of cuts may therefore be necessary to remove a desired depth of resin and provide a seal face of desired uniformity. The knife edge may desirably only contact the surface of the resinous mass at the knife edge such that the blade does not unduly drag across the surface of the resin. The cutting may conveniently be conducted at room temperature or at temperatures somewhat higher or lower than room temperature. Higher temperatures which may unduly soften the hollow filaments such that the hollow filaments tend to smear or deform closed during cutting are generally avoided. Frequently, the temperature of the resinous mass during cutting is about 0° to 40° C., preferably about 10° to 35° C.

The resinous mass may be cut by hand, or a suitable cutting means which provides a predetermined relationship between the resinous mass and the knife edge. One suitable cutting means provides the knife blade at an angle to the plane of movement of the blade in order to insure that the blade does not unduly drag on the surface of the resinous mass. Advantageously, the blade may be adapted to proceed at an angle to the perpendicular of the knife edge as it passes through the resinous mass in order to tend to equalize the wear over the length of the knife edge curing cutting. The knife edge may be propelled by any suitable drive means.

After cutting, the resin may be essentially completely cured to enhance the structural strength of the resinous mass and the sealing means. The curing may be conducted under suitable curing conditions such as ambient or moderately elevated temperature or by irradiation which are not deleterious to the hollow filaments or the desired separation characteristics of the filaments.

The following examples are provided to further illustrate the invention but are not in limitation thereof. All parts and percentages are by weight unless otherwise stated.

EXAMPLE I

A bundle of approximately 15000 hollow fibers, with sealed ends which fibers have an outside diameter of 300 microns and an inside diameter of 200 microns and are comprised of ethyl vinyl acetate polymer, is formed into a generally circular cross-section of about 6.4 centimeters in diameter and placed in a cylindrical mold having an inside diameter of about 6.4 centimeters and a depth of about 7.6 centimeters. A rigid cylindrical sleeve extends from the mold to contain the fibers. The bundle of fibers is essentially perpendicular to the hollow of the mold, and the ends of the fibers are adjacent to the bottom of the mold. Approximately 250 to 300 grams of a diglycidyl ether of bisphenol A (DGEBA) curable resin available under the tradename EPON 815 from the Shell Chemical Co. is introduced into the mold and the mold and epoxy are subjected to centrifugal force for approximately 24 hours to assist in distributing the epoxy resin throughout the fiber bundle. The mold is removed to expose a cylindrical resinous mass having a depth of about 10.4 centimeters (approximately 4 centimeters of the resinous mass extends into the rigid cylindrical sleeve).

Approximately 5.7 centimeters of the resinous mass is removed by cutting the cylinder with a saw to provide a test sample. The test sample provides a face, i.e., the portion from which the fibers extend, and a side. Four arbitrary points are selected across the face and three arbitrary points are selected around the side for determination of the hardness using a "Shore Durometer Type A-2" available from the Shore Instrument and Manufacturing Company. Three test points are also selected around the perimeter of the remaining portion of the resinous mass. Table I provides the hardness of the resinous mass at the predetermined points over a period of curing time. The curing is conducted at room temperature, i.e., about 22° to 25° C., and only a slight exotherm is observed.

The data illustrate that the structural integrity, as indicated by hardness, of the resinous mass increases with increased curing time. Between about 30 hours to about 45 hours, the epoxy becomes at least as hard as the composite of epoxy and fibers. At about 30 hours, the epoxy tends to smear when cut thereby obstructing the ends of the hollow fibers. By about 45 hours, the resinous mass achieves a hardness which is difficult to cut without undue damage to the fibers.

TABLE I

| Elapsed Time From Initial Casting, Hrs. | Loca-tion | Shore A Hardness (ASTM D 2240) | | | | | | | | | |
|---|---|---|---|---|---|---|---|---|---|---|---|
| | | Face | | | | Side, Adjacent to Face | | | Side, Remaining Portion | | |
| | | 1 | 2 | 3 | 4 | 1 | 2 | 3 | 1 | 2 | 3 |
| 26.25 | | 64* | 63* | 63* | 50 | 46* | 51* | 43* | 37 | 37 | 38 |
| 28 | | 66 | 70 | 68 | 53 | 47 | 48 | 50 | 45 | 44 | 45 |
| 29 | | 68 | 71 | 66 | 51 | 44 | 45 | 45 | 45 | 44 | 42 |
| 45.75 | | 88 | 88 | 86 | 89 | 95 | 93 | 93 | 84 | 83 | 83 |
| 48.5 | | 85 | 88 | 90 | 91 | 95 | 97 | 95 | 91 | 93 | 90 |
| 52.5 | | 97 | 90 | 89 | 92 | 97 | 98 | 97 | 95 | 97 | 97 |
| 241 | | 94 | 89 | 91 | 91 | 99 | 98 | 98 | 98 | 98 | 98 |

*Site of test differed from the site of the remaining tests.

EXAMPLE II

The procedure of Example I is essentially repeated using ethyl vinyl acetate fibers having an outside diameter of about 150 microns and an interior diameter of about 100 microns. The fiber bundle contains about 60,400 fibers and has a substantially circular cross-section with a diameter of about 6.4 centimeters. The epoxy seal which is formed is cylindrical and has a diameter of about 6.4 centimeters and a depth of about 7.5 centimeters.

The mold is removed from the epoxy seal after about 24 hours, and the epoxy is allowed to cure for about 10 to 12 hours. After this additional curing, the Shore A hardness of the face and sides of the partially-cured resinous mass are estimated to be about 70, and the seals are soft during cutting such as like rubber. Several thick cuts are made to even the face of the seal. Then, several final cuts are made by hand using a new knife blade. Each of the final cuts remove less than about 100 microns of the seal. The cutting procedures are conducted within about 15 minutes. Approximately 80 to 90 percent of the fiber ends are unobstructed after cutting. The seal continues to cure at room temperature and achieves a Shore A hardness greater than 90 within about 48 hours of the initial casting.

EXAMPLE III

As a comparison, the procedure of Example II is essentially repeated to pot hollow filaments except that the epoxy is allowed to substantially, fully cure prior to cutting. The openness of the filaments is determined by passing water at room temperature through the filaments and determining the flow rate and pressure drop of the water. The theoretical flow rate for a given pressure drop through the fibers is calculated using Poiseuilles law. No corrections are made for pressure losses in entering and exiting the hollow filaments. The results at varying absolute pressures and pressure differentials are provided in Table II

TABLE II

| Pressure Into Bore, psig | Pressure From Bore, psig | ΔP psi | Calculated Theoretical Flow, cc/min | Actual Flow cc/min | Openness Percent |
|---|---|---|---|---|---|
| 7 | 5 | 2 | 211 | 117 | 55 |
| 11 | 5 | 6 | 635 | 350 | 55 |
| 15 | 5 | 10 | 1058 | 561 | 53 |
| 25 | 5 | 20 | 2116 | 1156 | 54 |

TABLE II-continued

| Pressure Into Bore, psig | Pressure From Bore, psig | ΔP psi | Calculated Theoretical Flow, cc/min | Actual Flow cc/min | Openness Percent |
|---|---|---|---|---|---|
| 12 | 10 | 2 | 211 | 130 | 62 |
| 16 | 10 | 6 | 635 | 353 | 55 |
| 20 | 10 | 10 | 1058 | 571 | 54 |
| 30 | 10 | 20 | 2116 | 1185 | 56 |

EXAMPLE IV

The procedure of Example II is essentially repeated to pot hollow filaments. The openness of the fibers is determined by the procedure described in Example III. The results are provided in Table III.

TABLE III

| Pressure Into Bore, psig | Pressure From Bore, psig | ΔP psi | Calculated Theoretical Flow, cc/min | Actual Flow cc/min | Openness Percent |
|---|---|---|---|---|---|
| 1.9 | 0.2 | 1.7 | 122 | 113 | 92 |
| 4.7 | 0.5 | 4.2 | 302 | 272 | 90 |
| 7.7 | 0.6 | 7.1 | 510 | 440 | 86 |
| 9.0 | 0.4 | 8.6 | 618 | 530 | 86 |

It is claimed:

1. In a method for preparing a fluid separation apparatus comprising polymeric, semi-permeable hollow filaments wherein at least one end segment of each of the hollow filaments is secured in a substantially fluid-tight relationship in a sealing means comprising curable resin capable of achieving high structural strength, the improvement comprising embedding the hollow filaments in a substantially liquid, curable resin; partially curing the resin under curing conditions which are not unduly deleterious to the hollow filaments to provide a solid, partially-cured resinous mass having the hollow filaments embedded therein, said partially-cured resinous mass having sufficient structural integrity that it can be cut without undue non-elastic flowing of the resinous mass but does not have a hardness which renders the cutting difficult; cutting the partially-cured resinous mass generally transverse to the orientation of the hollow filaments with a sharp knife edge, said cutting exposing the bores of the hollow filaments and providing an openness of at least about 70 percent and said cutting being conducted at temperatures below those which unduly soften the hollow filaments such that the hollow filaments tend to smear closed during cutting; and subjecting the cut, partially-cured resinous mass to curing conditions to substantially fully cure the resinous mass.

2. The method of claim 1 in which the curable resin is capable of achieving a Shore A hardness greater than about 80.

3. The method of claim 2 in which the partially-cured resinous mass has a Shore A hardness of less than about 75.

4. The method of claim 3 in which the curable resin comprises an epoxy resin.

5. The method of claim 2 in which the hardness of the face of the partially-cured resinous mass having the hollow filaments embedded therein approximates the hardness of the partially-cured resin.

6. The method of claim 5 in which the partially-cured resinous mass has a Shore A hardness of less than about 75.

7. The method of claim 6 in which the curable resin comprises an epoxy resin.

8. The method of claim 6 in which the openness is at least about 80 percent.

9. The method of claim 6 in which the maximum outside dimension of the hollow filaments is about 50 to 800 microns and the minimum wall thickness of the hollow filaments is about 5 to 300 microns.

10. The method of claim 9 in which the partially-cured resin has a Shore A hardness of at least about 55.

* * * * *

UNITED STATES PATENT AND TRADEMARK OFFICE
CERTIFICATE OF CORRECTION

PATENT NO. : 4,183,890
DATED : January 15, 1980
INVENTOR(S) : Wayne A. Bollinger It is certified that error appears in the above-identified patent and that said Letters Patent are hereby corrected as shown below:

Column 2, line 66, delete "McLain" and insert -- Mendelson -- therefor.

Signed and Sealed this

Sixteenth Day of December 1980

[SEAL]

Attest:

SIDNEY A. DIAMOND

Attesting Officer

Commissioner of Patents and Trademarks